UNITED STATES PATENT OFFICE.

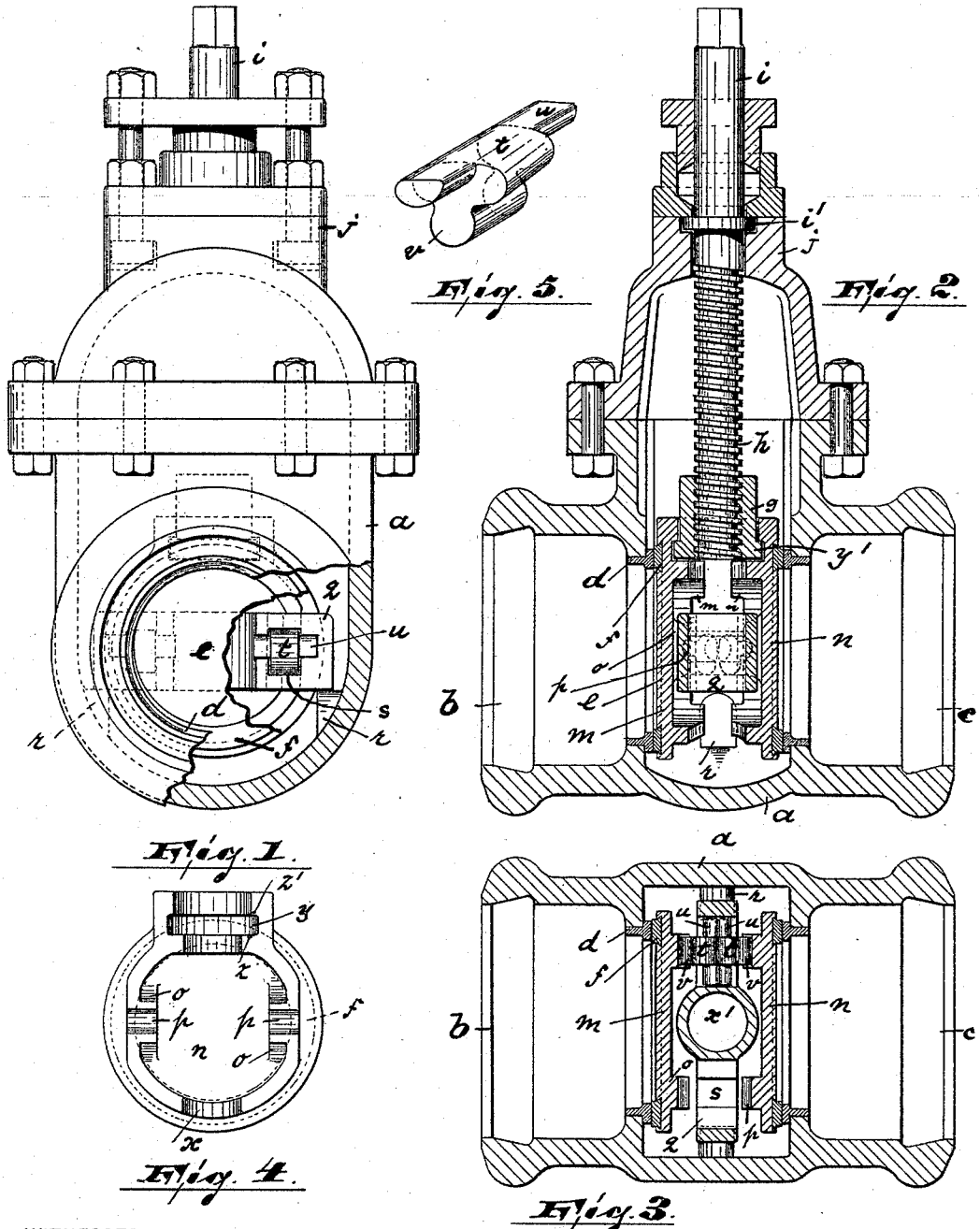

LINDEN SCOTT WHEATON, OF NEWARK, NEW JERSEY.

GATE-VALVE.

SPECIFICATION forming part of Letters Patent No. 526,797, dated October 2, 1894.

Application filed December 11, 1893. Serial No. 493,315. (No model.)

*To all whom it may concern:*

Be it known that I, LINDEN SCOTT WHEATON, a citizen of the United States, residing in Newark, county of Essex, and State of New Jersey, have invented certain new and useful Improvements in Gate-Valves; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new and useful improvement in expansible disk valves, and it consists in the arrangement and combination of parts, hereinafter described and claimed.

The invention is illustrated in the accompanying drawings, wherein—

Figure 1 is an end elevation partly sectioned of the improved valve. Fig. 2 is a vertical central section of the same; Fig. 3, a horizontal section taken through the center of the valve proper, certain portions of the valve mechanism being removed. Fig. 4 is an inside view of one of the gate plates of the valve, and Fig. 5 a perspective view of one of the eccentric wedges adapted to expand the valve.

In said drawings $a$ represents the shell of the valve and $b$ and $c$ the inlet and outlet openings therein. These openings $b$ and $c$ are each provided with a ring $d$ generally of non-corrosible metal, against which the disks of the valve $e$ are adapted to press when the valve is closed.

The valve $e$ consists of the two disks $m$ and $n$, each of which is provided on its outer face with a ring $f$ generally of non-corrosible metal, which rests against and registers with the ring $d$ on the outlet and inlet openings forming the valve seat. These disks $m$ and $n$ are secured at their upper end to a nut $g$ carried by the stem $i$ of the valve, and the said nut is adapted to be raised or lowered on the screw $h$ of the said stem $i$ of the valve. The stem $i$ has a collar $i'$, which has a bearing in the head $j$ of the shell in such a manner that the stem may be rotated without being raised or lowered. On the under side of each disk $m$ and $n$ are formed two lugs $o$, between which is formed a curved recess $p$.

Between the disks $m$ and $n$ is placed a yoke or cross-bar $q$, which is recessed as at $s$, at either end, to receive the shanks $u$ of two peculiarly shaped cam pieces or eccentric wedges $t$. The shanks $u$ of these cam pieces $t$ are arranged back to back parallel with the sides of the disks $m$ and $n$ and the projection $v$ of each cam $t$ fits into the recess $p$ in the disks $m$ and $n$. The lower end of the yoke or cross-bar $q$ is adapted to rest or bear upon the lugs or projections $r$ arranged on either side and at the bottom of the shell $a$, when the valve is closed down. At the upper end of the disks $m$ and $n$ is formed a semi-circular groove or recess $y$, which fits upon the annular collar $y'$ of the nut $g$. Said collar $y'$ bears in its upward pull upon the shoulder $z'$ and in its downward thrust upon the shoulder $z$. The whole valve $e$ travels upward or downward on the screw shank $h$ of stem $i$, and the valve is vertically perforated as at $x$ and $x'$ to permit the screw $h$ to penetrate the valve, when the same is raised.

In operation the valve $e$ is lowered by turning the stem $i$ until the yoke $q$ rests on the projections or lugs $r$ and the rings $f$ of the disks $m$ and $n$ rest upon and register with the rings or valve seats $d$. Upon turning the stem $i$ still farther, the cross bar $q$ remains stationary while the disks move, and the shanks $u$ and the back of the eccentric wedges $t$, carried by said yoke, are pressed against each other, thus throwing the cam projections $v$ outward. These cams $u$ press against the disks $m$ and $n$ at the recessed points $p$ and throw the said disks forward and clamp them firmly down upon the valve seat.

Having thus described my invention, what I claim as new, and desire to secure by Letters Patent, is—

1. The herein described valve mechanism, consisting of the two disks provided with inwardly projecting recessed lugs, a yoke placed between said disks, cam pieces having bearing faces in contact with each other carried by said yoke and bearing against said recessed lugs of said disks, all arranged so that, when the disks are lowered to close the valve, the yoke remains stationary and the cam pieces force the disks outward in opposite directions, substantially as described.

2. In a valve, the combination of the shell, the stem, the disks carried and adapted to be raised and lowered in said shell by said stem, with the yoke placed between said disks, cam pieces carried by said yoke and adapted to bear against said disks, and lugs placed in the lower end of said shell, upon which lugs the yoke is designed to rest when the valve is closed down, all arranged so that, when the disks are lowered, the yoke remains stationary and the cam pieces force the disks outward in opposite direction, substantially as described.

3. The combination in a valve, of the shell $a$ provided with the inlet and outlet openings $b$ and $c$, and with the projections $r$ at its lower end, a stem $i$ rotating in the upper end of the shell, a screw $h$ at the lower end of said stem, a nut $g$ carried on said screw, and disks $m$ and $n$ secured to said nut, with the yoke $q$ placed between said disks, the cam pieces $t$ carried by said yoke and having bearing faces in contact with each other, said cam pieces being provided with a cam surface $v$, adapted to bear against the surface of said disks $m$ and $n$, all arranged so that when said stem $i$ is turned, the nut $g$ and disks $m$ and $n$ are lowered in the shell to close the inlet and outlet openings, until the yoke $q$ rests upon the projections $r$, when the cam pieces are operated to throw the disks $m$ and $n$ outward to bind against the said inlet and outlet openings, substantially as described.

In testimony that I claim the foregoing I have hereunto set my hand this 22d day of November, 1893.

LINDEN SCOTT WHEATON.

Witnesses:
ALFRED GARTNER,
WM. D. BELL.